No. 732,184. PATENTED JUNE 30, 1903.
B. M. W. HANSON.
DIMENSIONING APPARATUS.
APPLICATION FILED JUNE 25, 1902. RENEWED MAY 19, 1903.
NO MODEL. 5 SHEETS—SHEET 1.

Fig. 1.

Witnesses:
E. R. Shipley.
M. S. Belden.

Bengt M. W. Hanson
Inventor
by James W. See
Attorney

No. 732,184. PATENTED JUNE 30, 1903.
B. M. W. HANSON.
DIMENSIONING APPARATUS.
APPLICATION FILED JUNE 25, 1902. RENEWED MAY 19, 1903.
NO MODEL. 5 SHEETS—SHEET 2.

Fig. 2.

Witnesses:
E. R. Shipley
M. S. Belden

Bengt M. W. Hanson
Inventor
by James W. See
Attorney

No. 732,184. PATENTED JUNE 30, 1903.
B. M. W. HANSON.
DIMENSIONING APPARATUS.
APPLICATION FILED JUNE 25, 1902. RENEWED MAY 19, 1903.
NO MODEL. 5 SHEETS—SHEET 3.

Witnesses:
E. R. Shipley.
M. S. Belden.

Bengt M. W. Hanson Inventor
by James W. See
Attorney

No. 732,184. PATENTED JUNE 30, 1903.
B. M. W. HANSON.
DIMENSIONING APPARATUS.
APPLICATION FILED JUNE 25, 1902. RENEWED MAY 19, 1903.
NO MODEL. 5 SHEETS—SHEET 4.

Witnesses:
E. R. Shipley
M. S. Belden

Bengt M. W. Hanson
Inventor
by James W. See
Attorney

No. 732,184. PATENTED JUNE 30, 1903.
B. M. W. HANSON.
DIMENSIONING APPARATUS.
APPLICATION FILED JUNE 25, 1902. RENEWED MAY 19, 1903.
NO MODEL. 5 SHEETS—SHEET 5.

Witnesses:

Bengt M. W. Hanson
Inventor
by James W. See
Attorney

No. 732,184. Patented June 30, 1903.

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT.

DIMENSIONING APPARATUS.

SPECIFICATION forming part of Letters Patent No. 732,184, dated June 30, 1903.

Application filed June 25, 1902. Renewed May 19, 1903. Serial No. 157,884. (No model.)

*To all whom it may concern:*

Be it known that I, BENGT M. W. HANSON, a citizen of Sweden, residing at Hartford, Hartford county, Connecticut, have invented certain new and useful Improvements in Dimensioning Apparatus, of which the following is a specification.

This invention pertains to an improved apparatus for the production of accurate dimensions upon pieces being worked.

Broadly stated, a mechanical feeler continuously engages the surface being reduced and advances as the surface becomes reduced, the advance of the feeler under the influence of continued reduction of surface finally reaching the point corresponding with the predetermined degree of ultimate reduction of surface, whereupon the feeler, acting through suitable connections, arrests the aggressive advance of the reducing agent. As a further refinement, useful in extreme precision work, the advance of the feeler may when the reduction has reached nearly to the desired ultimate extent cause the reducing agent, while continuing its work of reduction, to do so with a lessened degree of aggressiveness, the earlier steps in the reduction being thus performed with greater rankness than the later steps which produce the ultimate precise dimensioning.

While this apparatus is applicable to the dimensioning of a variety of materials by means of an appropriate variety of reducing agents, it has special value in the accurate dimensioning of metallic articles by the process of grinding, and I herein exemplify my invention by a grinding-machine adapted for the production of accurately-dimensioned cylindrical objects. In the exemplifying-machine the work revolves and is traversed by a grinding-wheel, as usual. The feeler-lever bears constantly upon the work and moves as the diameter of the work is reduced. At each reversal of the traverse of the grinding-wheel along the work it is automatically advanced radially a trifle for the new cut, the degree of this intermittent advance being adjusted to suit the earlier or rougher steps in the reduction of size. When the feeler indicates that the desired ultimate size has been nearly reached, then automatically it causes the intermittent radial advance of the grinding-wheel to be lessened in degree, whereby the final steps of reduction are accomplished with comparatively light cuts. When the feeler indicates that the desired size has been reached by the successive reductions, then it automatically arrests the radial advance of the grinding-wheel. Electropneumatic connections are employed between the feeler-lever and the feed-work of the grinding-wheel for the controlling action indicated.

My invention and the grinding-machine set forth in exemplification of it will be readily understood from the following description, taken in connection with the accompanying drawings, in which—

Fig. 3 is a plan, partly diagrammatic, of the motion work pertaining to the automatic reversal of the traverse of the carriage of the grinding-wheel; Fig. 4, a side elevation of the reversing-clutch and its shifter; Fig. 5, a vertical section of the shifter of the reversing-clutch in a plane parallel with the axis of the shifter; Fig. 6, a vertical section of the clutch-shifter in a plane at right angles to its axis; Fig. 7, a front elevation of the dog mechanism for adjustably determining the time of reversal for the traverse of the wheel-carriage.

It may be well to first explain generally the exemplifying grinding-machine, then the automatic reversing system for the traverse of the wheel, then the means for automatically setting the wheel for new cut, and then the action of the feeler in controlling the rate of setting and its final cessation.

*The general grinding-machine.*—In the drawings, 1 indicates the bed of the machine; 2, the usual head-stock, mounted on the bed for supporting and driving the work; 3, the usual tail-stock; 4, the work being operated upon; 5, a longitudinal guideway on the bed for the carriage of the grinding-wheel; 6, the saddle of the wheel-carriage, sliding along this guideway; 7, the housing for the grinding-wheel, sliding, as usual, transversely in the saddle; 8, the cross-feed screw, by which the wheel-housing is adjusted in and out in a saddle to effect the setting of the wheel; 9, the grinding-wheel, mounted, as usual, in the wheel-housing and adapted to operate on the work; 10, a vertical shaft carried by the wheel-housing and bevel-geared to the cross-feed screw; 11, a horizontal shaft carried by the wheel-housing and bevel-geared to the vertical shaft 10 and projecting toward the front of the machine, the front of the machine being in the present case at that side of the work opposite the one on which the grinding-wheel operates; 12, a handle on the forward end of this shaft, whereby the workman standing at the front of the machine may conveniently turn the cross-feed screw and adjust the setting of the wheel; 13, a rack carried by the base of the wheel-carriage and extending along in the upper part of guideway 5 and having a length somewhat in excess of the greatest travel desired for the wheel-carriage; 14, a feed-shaft journaled across the bed; 15, a gear fast on this feed-shaft and engaging the carriage-rack, and 16 a hand-wheel fast on the front end of the feed-shaft.

The work is supported and rotated as usual, and the carriage may be moved along the bed by turning hand-wheel 16, so as to traverse the wheel along the work. By turning handle 12 the wheel may be set inward or outward to regulate the depth of cut.

*Automatic reversal of wheel traverse.*—Proceeding with the drawings, 17 indicates a shaft journaled in the bed parallel with its length and bevel-geared to feed-shaft 14; 18, a pair of gears loose thereon and provided with clutch-hubs; 19, a double-faced clutch splined on shaft 17 between the clutch-hubs of the two gears 18; 20, a shaft mounted in the bed parallel with shaft 17 and carrying fixed gears driving the two gears 18, one direct and the other through an intermediate, so that the gears 18 are driven in opposite directions; 21, a pulley on shaft 20, whereby the traversing motion for the wheel-carriage may be gotten by belt; 22, a concentric flange of V-shaped cross-section on double clutch 19; 23, a rock-shaft journaled in the bed at right angles to shaft 17 and below its plane; 24, a clutch-shifting arm mounted on the inner end of this shaft; 25, a pair of pins projecting inwardly from the upper end of this shifter-arm and straddling the flange 22, whereby the rocking of shaft 23 will effect the shifting of the clutch to one or the other of gears 18, so as to cause shaft 17 to turn in one or the other direction, and thus traverse the wheel-carriage along the bed in one or the other direction; 26, a handle on the outer end of rock-shaft 23, whereby the clutch may be shifted by hand; 27, a dog-arm fast on the outer end of rock-shaft 23; 28, a disk fast on feed-shaft 14; 29, dogs carried by this disk and angularly adjustable thereon and adapted, as the feed-shaft turns, to engage dog-arm 27 and rock the rock-shaft and throw the clutch one way or the other; 30, an arm hung on a pivot above rock-shaft 23 and having a socket below and radial to shaft 17; 31, stops to limit the vibration of this arm; 32, a downward projection from clutch-shifting arm 24 into a mortise in arm 30, whereby the oscillation of clutch-throwing arm 24 enforces oscillation of arm 30 in a direction the reverse of that moved in by pins 25, and 33 a spring-pressed wedge-ended plunger-carriage in the socket of arm 30 and adapted to engage first one side and then the other of flange 22 and to ride under the flange in passing from one side to the other.

Figure 1:
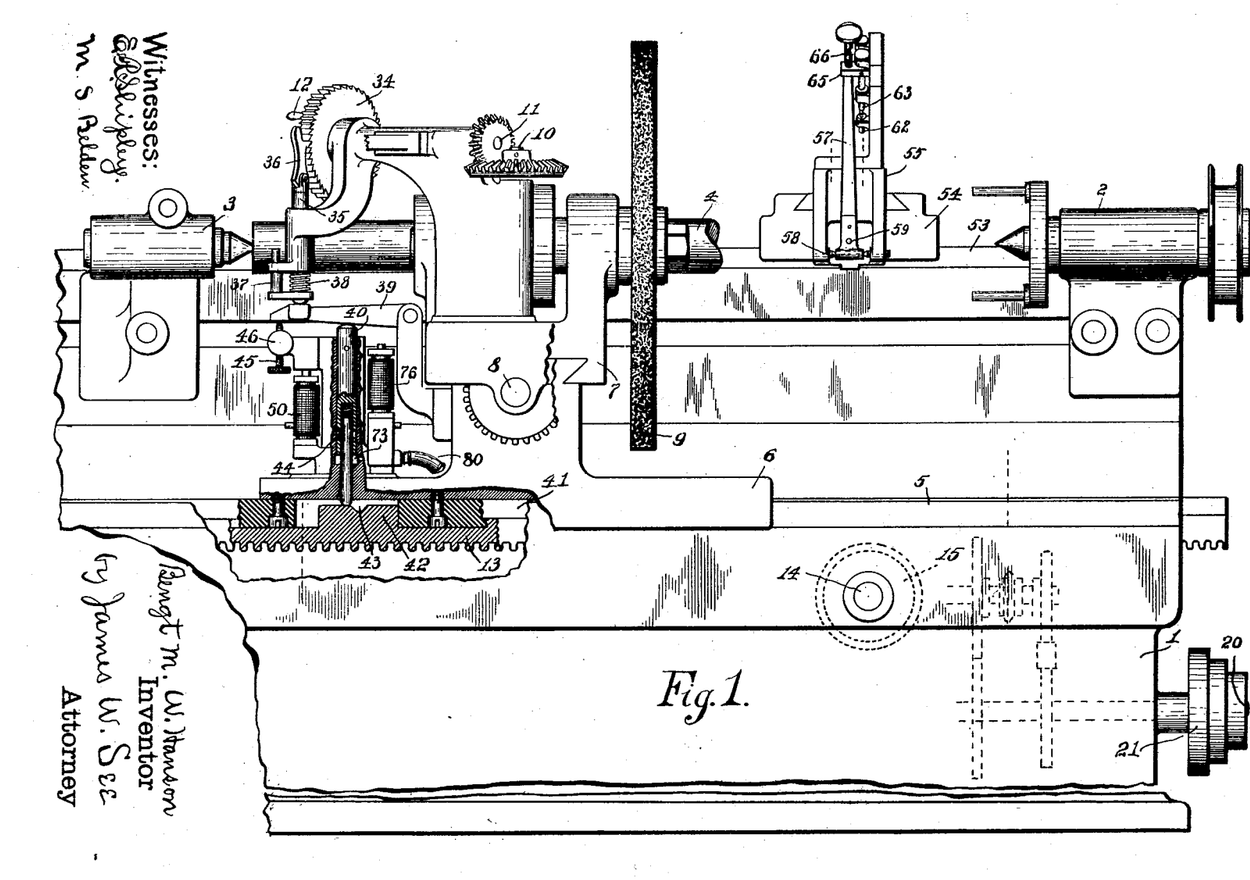
Figure 1 is a rear elevation of the grinding-machine, parts appearing in vertical section, the rear of the machine being considered as corresponding with the side of the work which is traversed by the grinding-wheel.
Figure 2:
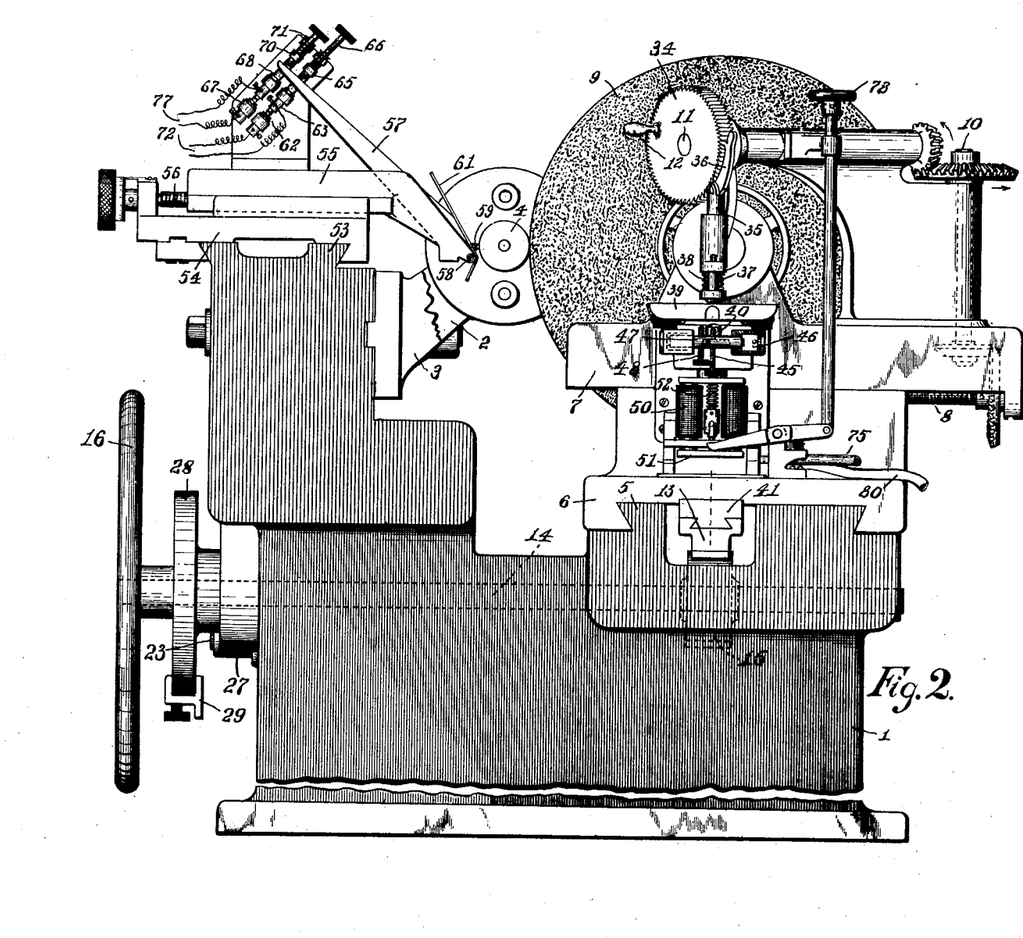
Fig. 2, an end elevation of the same, as at the left-hand end of Fig. 1, the tail-stock being omitted.
Figures 3, 4, 5, 6, 7, 14:
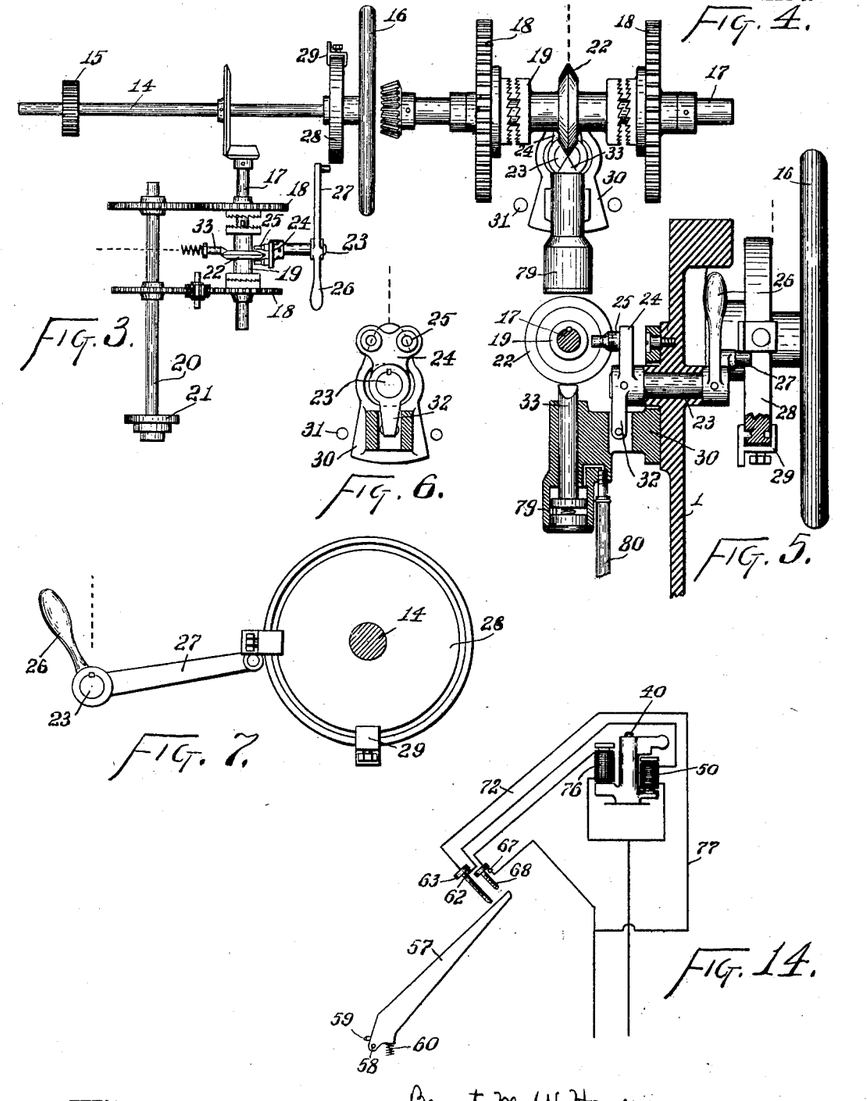
Figures 8, 9, 10:
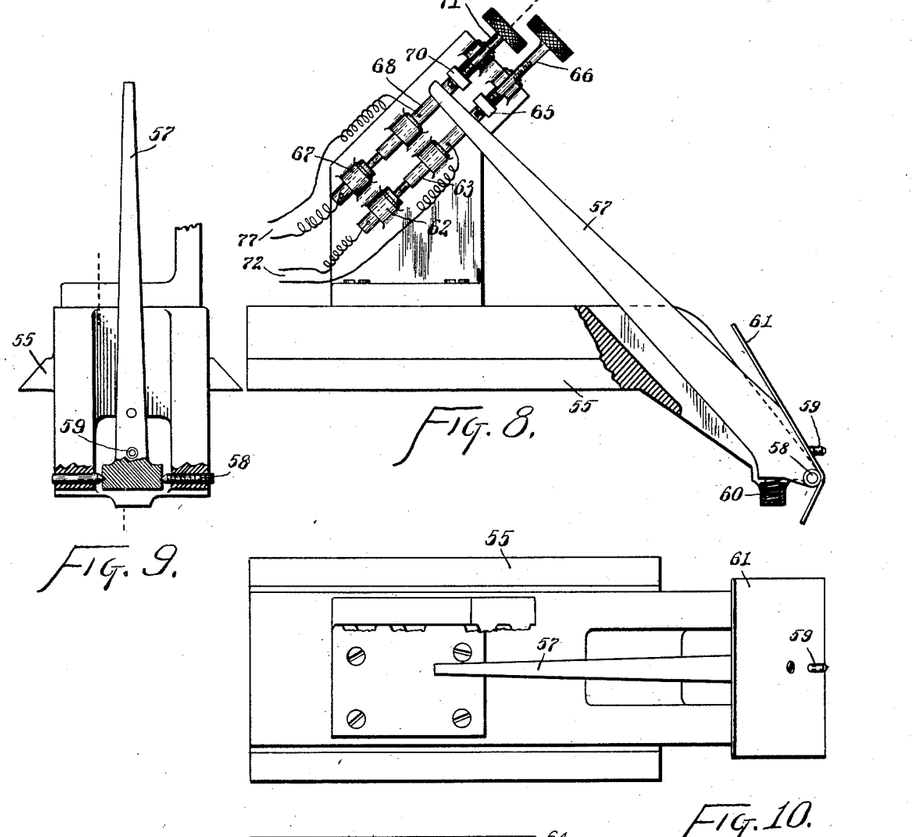
Fig. 8, a side elevation of the feeler-lever and its immediate accessories.
Fig. 9, a rear elevation of the same.
Fig. 10, a plan of the same.
Figure 11:
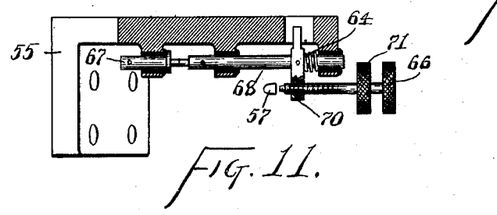
Fig. 11, a plan part-horizontal section of the circuit-breaker actuated by the feeler-lever.
Figure 12:
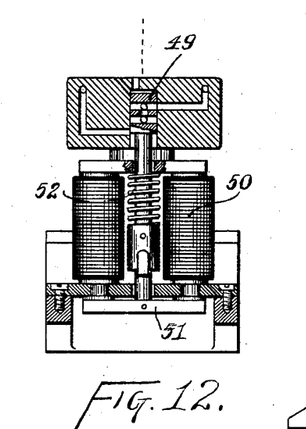
Fig. 12, a side elevation part-vertical section of the electropneumatic device for controlling the depth of cut to be taken by the wheel, or, to adopt a preferred expression, the "setting" of the wheel.
Figure 13:
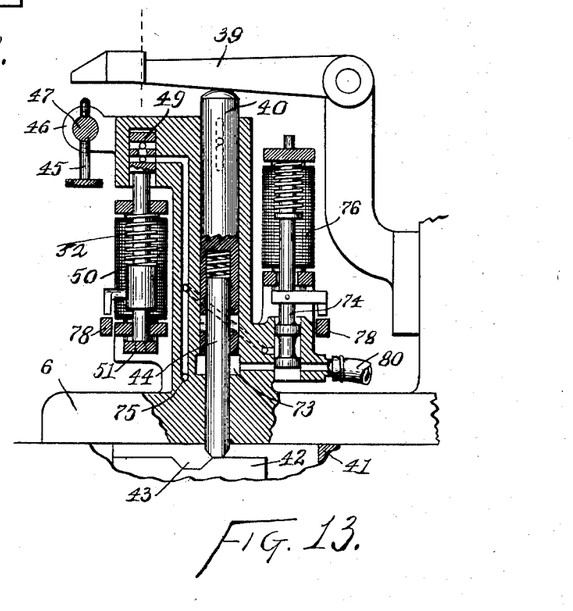
Fig. 13, an elevation with contiguous parts in vertical section of the setting-plunger and its controlling-valve, and Fig. 14 a diagram of the electric circuits.

By means of the handle 26 the workman may start up the traversing of the wheel-carriage and reverse its motion, as desired, or hold the clutch to neutral position and bring the carriage to rest. He may set the dogs upon the disk, so that when the carriage has reached a given point in its travel in one direction a dog will strike the dog-arm and shift the clutch and cause the carriage motion to reverse, the other dog again reversing the motion when the other adjusted for limit of carriage travel is reached. The effect of the clutch-throwing arm 24 under the influence of the reversing-dogs is not actually to reverse the motion but to merely release the clutch, for the clutch having reached the point of release the feed-shaft, and consequently the active dog, may come to rest before throwing the clutch into engagement with the other clutch-wheel, and in the present case, as will be later explained, it is not desirable that the dog shall effect the full reversal, for it becomes desirable to arrest the traversing motion entirely by leaving the clutch in neutral position. It is the duty of plunger 33 to complete the throwing of the clutch and the reversal of carriage motion after the dog has released the clutch and thrust it within range of the plunger. The action of such a plunger or equivalent device upon the clutch is well understood; but in the present case certain peculiarities are presented. In diagrammatic Fig. 3 the plunger 33 has been displaced in order to bring it into the plane of view, and as it there appears it might be and act as the ordinary devices used on clutches and the like to carry them past a neutral point; but in the present case the plunger shifts sidewise instead of remaining in the neutral plane. As the clutch is shifted in one direction under the influence of the rock-shaft the plunger shifts in the other direction, so as to get behind the flange of the clutch and urge it to complete its motion. Additional functions of this plunger will be referred to later on.

*Automatic setting of the wheel.*—Proceeding with the drawings, 34 indicates a ratchet-wheel fast on setting-shaft 11; 35, a vertically-moving plunger carried by the wheel-housing below and about tangent to this ratchet-wheel; 36, a spring-pawl carried by the upper end of this plunger and acting on the ratchet-wheel and serving to turn it in a direction corresponding with the inward setting of the grinding-wheel; 37, a stop to limit the upward motion of the plunger and pawl; 38, a spring upon the plunger, urging it downward; 39, a horizontal arm pivoted to the wheel-housing and engaging under the plunger; 40, a vertical plunger mounted in the saddle of the wheel-carriage and acting upwardly on arm 39, its lower end projecting down through the saddle, this plunger being splined against rotation in its guideway; 41, a dovetailed rib secured to the bottom of the saddle of the wheel-carriage and extending longitudinally of the bed and engaging a longitudinal dovetailed groove in the rack thereof and serving as the means by which the rack is connected with the saddle, this rib-and-groove arrangement permitting the rack to slide relative to the saddle; 42, a lug projecting from the rack into a slot in rib 41 and serving to limit the sliding motion of the rack relative to the saddle, the foot of plunger 40 resting on the top of this lug, which slides along under it as the lug makes its limited endwise motion in its slot, the plunger when thus supported by the top surface of the lug being at the upward limit of its motion; 43, a beveled notch in the lug adapted at each sliding of the lug to permit the foot of the plunger to drop into it and then ride out of it, whereby at each sliding of the lug the plunger is given a stroke equal to the depth of the notch; 44, a telescopic spring-joint in plunger 40, having a pin to limit its extension, this spring-joint serving to compensate for wear, altering the total length of the plunger, and 45 a stop-screw disposed below arm 39 and serving to adjustably limit its downward motion, and consequently limit the stroke of the setting-pawl.

At each reversal of the motion of the feed-shaft the rack is impelled endwise in the direction of the newly-installed feed motion; but owing to the sliding engagement of the rack with the saddle the rack will move a limited distance, as permitted by the slot and lug, before the carriage partakes of the motion of the rack. This endwise movement of the rack relative to the saddle causes the foot of plunger 40 to drop into the notch of the lug and permits the setting-pawl to come down, the riding of the foot of the plunger up out of the notch causing the pawl to make its return active stroke against its stop. By this means there is produced at each reversal of the carriage motion a pawl-stroke and consequent inward setting of the wheel equal to the maximum degree of setting for the wheel, as represented by a certain number of teeth on the ratchet-wheel. Under the conditions named each reversal would produce a maximum degree of setting for the wheel. By adjusting stop-screw 45 upwardly the descent of the arm can be limited, and thus the degree of setting be adjusted, for it being manifest that if stop-screw 45 were adjusted high enough to hold the arm and pawl-plunger to its highest position then the pawl would have no stroke and plunger 40 would reciprocate idly at each reversal. It may be mentioned that the pawl-plunger moves inwardly and outwardly with the wheel-housing which carries it, while arm 39, which acts on its foot, does not so move, being supported by the saddle. The motion of the pawl-plunger relative to the arm is provided for by sufficiently extending the width of the arm in a direction transverse to the bed of the machine at the point where it engages under the pawl-plunger.

*The action of the feeler.*—Proceeding with the drawings, 46 indicates a small pneumatic engine supported by the saddle with its axis disposed horizontally across under the outer portion of arm 39 and in the vertical plane of stop-screw 45; 47, the piston of this engine, the same being feathered to prevent rotation and having threaded into it the stop-screw 45, the arrangement being such that when the piston is at one extreme of its stroke the stop-screw 45 is in active position under arm 39, so as to adjustably limit the descent of that arm, and when the piston is at the other extreme of its stroke the stop-screw in question is out from under the arm, so that the descent of the arm may be uninfluenced by the screw; 48, a second stop-screw similar to stop-screw 45 and threaded into piston 47 at another point in the length thereof in such position that when the piston goes to one end of its stroke it puts one of the stop-screws under arm 39 and leaves the other free thereof, while when the piston is at the other end of its stroke it puts the first stop-screw in idle position and brings the second one under arm 39, the arrangement being manifestly such that by shifting the piston 47 the stroke of the pawl can be put under the control of either of the two screws selectively and that the two screws being differently adjusted the length of pawl-stroke and consequent degree of setting advance for the grinding-wheel will be dependent on whether the piston is at one or the other end of its stroke; 49, the vertically-reciprocating valve for engine 46 of obvious construction and usual engine function, the valve in its upper position letting air to one end of the engine and putting the piston thereof in such position as to bring stop-screw 45 to active position under arm 39, the valve in its downward position letting air to the opposite end of the engine and exhausting it from the first end, so as to carry stop-screw 45 out from under arm 39 and put stop-screw 48 in its place; 50, an electromagnet supported by the saddle below and in the vertical plane of valve 49, the poles of this magnet presenting downwardly and the stem of the valve passing downwardly between the coils; 51, the armature of the magnet fast on the lower end of the stem of valve 49, the construction being such that when the magnet is energized and the armature up then the valve will be in its upper functional position, and when the magnet is deënergized and the armature down then the valve will be in its lower functional position; 52, a spring upon the valve-stem serving to aid the gravity of the armature and attached parts in carrying the valve to downward position, the lower end of this spring abutting against a collar on the valve-stem, which collar stops against the lower guide of the valve-stem and limits the downward motion of the parts; 53, a longitudinal guideway on the front portion of the machine-bed; 54, a feeler-saddle adjustable along this guideway; 55, a feeler-housing mounted to slide in the feeler-saddle in a direction transverse to the axis of the machine; 56, a cross-screw for adjusting the housing in the saddle, this screw being provided with a micrometer; 57, a feeler-lever pivoted to the feeler-housing on a pivot parallel with the axis of the work; 58, the pivot of this lever; 59, the feeler-point carried by the lever near this pivot and adapted to bear against the surface of the work being operated upon by the grinding-wheel, the feeler-point being formed of hard material; 60, a spring acting on the feeler-lever and holding the feeler-point against the work; 61, a shield disposed in front of the pivot end of the feeler-lever between its pivot and the work and serving to protect the latter from fouling; 62, a fixed electrical contact supported by the feeler-housing below the free end of the lever; 63, an endwise-sliding contact-piece engaging contact 62; 64, a spring serving to press the movable contact to the fixed one; 65, an arm projecting from the sliding contact-piece over the outer end of the feeler-lever; 66, an adjusting-screw threaded through this arm and presenting its point over the free end of the feeler-lever; 67, 68, 69, 70, and 71, parts of a second similar contact arrangement carried by the feeler-housing and presenting its adjusting-screw over the free end of the feeler-lever, and 72 an electric circuit including electromagnet 50 and a source of current and closed by contacts 62 and 63.

Assume the machine to be in operation with the wheel traversing along and reducing the work and being set inwardly for a new cut at each reversal of wheel traverse, all the operations being automatic, as will be understood from previous description. Contacts 62 and 63 being together the circuit through magnet 50 is closed, and consequently its armature is up and the valve in its upper position and piston 47 to the left and stop-screw 45 under arm 39. Under these conditions the setting advance of the wheel for a new cut at each reversal of wheel traverse will be in degree as determined by the adjustment of stop-screw 45. At each successive reduction of the work the feeler-point moves toward the center of the work and the free end of the lever moves upwardly through a magnified distance. Screw 66 will have been adjusted so that when the work reaches a degree of reduction close to the ultima then the feeler-lever will engage this screw and open the contacts controlling circuit 72. Magnet 50 now becomes deënergized, the result manifestly being that piston 47 shifts and displaces stop-screw 45 and substitutes stop-screw 48, which will have been adjusted in higher degree, thus lessening the downward stroke of the setting-pawl and causing the succeeding settings of the wheel to be in gentler degree than that previously obtaining. It is thus seen that the primary reduction of the work may be accomplished by means of comparatively rank cuts, the later work being done by gentler cuts.

Proceeding with the drawings, 73 indicates a pneumatic engine formed by plunger 40 and its guideway, a downwardly-presenting shoulder on the plunger in connection with the reduced lower end of the plunger forming the piston of this engine, the guideway of the plunger below the shoulder forming the cylinder; 74, a vertically-moving valve of ordinary construction controlling this engine, its function being when down to admit compressed air to lift the plunger and when up to permit that air to exhaust; 75, the general supply-conduit from a suitable source of supply, conveying compressed air to the valves of the two pneumatic engines, which have been referred to, the arrangement of passages being obvious from the drawings; 76, a second electromagnet, armature, &c., similar to that heretofore described, carried by the saddle and serving to operate valve 74, this magnet when energized putting engine 73 to exhaust and when deënergized putting compressed air to it; 77, an electric circuit, including source of current and the electromagnet just referred to and closed by the contacts of the second contact device, previously referred to as being controlled by the feeler-lever, and 78 a handle having rod and forked lever connections with both the valve-stems that have been referred to and serving as means by which both valves can be moved to upward position or position corresponding with that produced by the energization of their controlling-magnets.

Under the feeler action which has thus far been described the reaching of given approximate reduction of work resulted in the automatic change to lessen rankness in the successive following reductions. Under these conditions the reduction proceeds till the work reaches ultimate size and the feeler-lever opens the second contact, whose adjusting-screw has been appropriately adjusted. During this working, as well as previously, electromagnet 76 has been energized, holding valve 74 in open position and leaving plunger 40 free of pneumatic influence and permitting it to make its full strokes under the influence of the notch of the lug on the rack of the wheel-saddle. When the second contact is opened by the feeler-lever, occurring when the work reaches ultimate size, then magnet 76 becomes deënergized and valve 74 moves downward and puts air to engine 73 and holds upward plunger 40, and consequently the setting-pawl, the air thus holding the pawl-moving parts and the pawl idly at the upper extreme of stroke and preventing the notch of the saddle-rack from having any influence upon the pawl. Under these conditions the setting of the wheel will cease and no further reduction of the work will take place. The screws through which the feeler-lever opens the contacts successively may be adjusted as desired, so that the amount of reduction which is to be effected under the gentler degree of wheel-setting may be such as is dictated by judgment and practice. By means of cross-screw 56 the entire feeler mechanism may be adjusted to and from the work, and accurate sizes may be read directly from the micrometer of this screw. When the grinding operation is initiated and the feeler-point is against the unreduced work, the contacts controlled by the feeler will be closed and the magnets energized; but the armatures may be so far from the magnet-poles as to not be attracted, thus leaving the valves in abnormal condition at the start; but by actuating the handle 78 both armatures may be moved to position of attraction and both valves thus be put in normal position, the handle mechanism then becoming idle and leaving the armatures under the control of their magnets. It will thus be seen that the reduction proceeds automatically till a given approximation to the ultima is reached, the rate of wheel-setting being normal, and that then the rate-lessening mechanism becomes effective, so that the final work is done at comparatively delicate rate of reduction.

Proceeding with the drawings, 79 indicates a pneumatic engine carried by arm 30, its piston being connected with wedge-ended plunger 33, so that if air-pressure be admitted over the piston the plunger will be drawn out of action, and 80 a conduit leading from this engine above its piston to valve 74, which upon admitting air to the engine, which arrests the motion of the setting-pawl, simultaneously admits air to engine 79 and retracts wedge-ended plunger 33 out of action.

It has been heretofore explained that the dogs initiate the reversal of wheel traverse, the reversal being completed by the action of the wedge-ended plunger on the reversing-clutch. When the second electric contact is opened by the feeler and the setting of the wheel is thus stopped by the action of the pneumatic engine controlling the setting-pawl, the traverse of the wheel continues to the end of the trip, and under normal reversing conditions reversing would take place and the wheel would return along the work without being set for a new cut; but wedge-ended plunger 33 having been withdrawn when size was reached the traversing trip is completed; but no reversal takes place. The clutch is, however, at liberty to be thrown by the handle.

The grinding-machine which I have employed in typifying a reducing-machine in exemplifying my dimensioning system presents many points of practical novelty apart from the feeler system; but these points of practical novelty are not herein claimed, the present claims concerning themselves only with the feeler system of dimensioning apparatus in connection with the illustrated grinding-machine or any other form of reducing-machine capable of coaction with the feeler for the purpose of automatic dimensioning. The particular construction and mounting of the feeling agent and the particular character of the connections between it and the mechanism which it is to control are illustrated in merely preferable form, and the system will obviously lend itself to many modifications suited to various conditions of use. Indeed, it is to be clearly understood that my purpose has been to set forth the principle of my invention and to furnish a single exemplification of its embodiment representing the best mode in which I at present contemplate applying that principle.

I claim as my invention—

1. In a dimensioning apparatus, the combination, substantially as set forth, with a reducing agent, setting mechanism for automatically advancing said agent to the work to effect continued reduction, and an arresting device to cause said setting mechanism to cease its action and stop the reduction, of a feeling agent bearing on the surface being operated upon and advancing as the reduction progresses, and connections between said arresting device and feeling agent to cause the former to become active and stop the reduction when the latter has advanced a given distance.

2. In a dimensioning apparatus, the combination, substantially as set forth, with a reducing agent, setting mechanism for automatically advancing said agent to the work at a given rate to effect continued reduction, a rate-lessening mechanism to lower the rate of the reducing advance of the reducing agent, and an arresting device to cause said setting mechanism to cease its action and stop the reduction, of a feeling agent bearing on the surface being operated upon and advancing as the reduction progresses, and connections between said feeling agent and rate-lessening mechanism and arresting device to cause the rate-lessening mechanism to act when the feeling agent has advanced a given distance and the arresting device to act when the feeling agent has advanced a given farther distance.

3. In a dimensioning apparatus, the combination, substantially as set forth, with a reducing agent, setting mechanism for automatically advancing said agent to the work at a given rate to effect continued reduction, a rate-lessening mechanism to lower the rate of the reducing advance of the reducing agent, and an arresting device to cause said setting mechanism to cease its action and stop the reduction, of a feeling agent bearing on the surface being operated upon and advancing as the reduction progresses, connections between the feeling agent and rate-lessening mechanism to cause the rate-lessening mechanism to act when the feeling agent has advanced a given distance, and independent connections between the feeling agent and the arresting device to cause the arresting device to act when the feeling agent has advanced a given farther distance.

4. In a dimensioning apparatus, the combination, substantially as set forth, with a reducing agent, setting mechanism for automatically advancing said agent to the work to effect continued reduction, and an arresting device to cause said setting mechanism to cease its action and stop the reduction, of a pivoted feeling-lever bearing on the surface being operated upon and advancing as the reduction progresses, and connections between said arresting device and feeling agent to cause the former to become active and stop the reduction when the latter has advanced a given distance.

5. In a dimensioning apparatus, the combination, substantially as set forth, with a reducing agent, setting mechanism for automatically advancing said agent to the work at a given rate to effect continued reduction, a rate-lessening mechanism to lower the rate of the reducing advance of the reducing agent, and an arresting device to cause said setting mechanism to cease its action and stop the reduction, of a pivoted feeling-lever bearing on the surface being operated upon and advancing as the reduction progresses, and connections between said feeling agent and rate-lessening mechanism to act when the feeling agent has advanced a given distance and the arresting device to act when the feeling agent has advanced a given farther distance.

6. In a dimensioning apparatus, the combination, substantially as set forth, with a reducing agent, setting mechanism for automatically advancing said agent to the work at a given rate to effect continued reduction, a rate-lessening mechanism to lower the rate of the reducing advance of the reducing agent, and an arresting device to cause said setting mechanism to cease its action and stop the reduction, of a pivoted feeling-lever bearing on the surface being operated upon and advancing as the reduction progresses, connections between the feeling agent and rate-lessening mechanism to cause the rate-lessening mechanism to act when the feeling agent has advanced a given distance, and independent connections between the feeling agent and the arresting device to cause the arresting device to act when the feeling agent has advanced a given farther distance.

7. In a dimensioning apparatus, the combination, substantially as set forth, with a reducing agent, setting mechanism for automatically advancing said agent to the work to effect continued reduction, and an arresting device to cause said setting mechanism to cease its action and stop the reduction, of a spring-pressed pivoted feeling-lever bearing on the surface being operated upon and advancing as the reduction progresses, and connections between said arresting device and feeling agent to cause the former to become active and stop the reduction when the latter has advanced a given distance.

8. In a dimensioning apparatus, the combination, substantially as set forth, with a reducing agent, setting mechanism for automatically advancing said agent to the work at a given rate to effect continued reduction, a rate-lessening mechanism to lower the rate of the reducing advance of the reducing agent, and an arresting device to cause said setting mechanism to cease its action and stop the reduction, of a spring-pressed pivoted feeling-lever bearing on the surface being operated upon and advancing as the reduction progresses, and connections between said feeling agent and rate-lessening mechanism to act when the feeling agent has advanced a given distance and the arresting device to act when the feeling agent has advanced a given farther distance.

9. In a dimensioning apparatus, the combination, substantially as set forth, with a reducing agent, setting mechanism for automatically advancing said agent to the work at a given rate to effect continued reduction, a rate-lessening mechanism to lower the rate of the reducing advance of the reducing agent, and an arresting device to cause said setting mechanism to cease its action and stop the reduction, of a spring-pressed pivoted feeling-lever bearing on the surface being operated upon and advancing as the reduction progresses, connections between the feeling agent and rate-lessening mechanism to cause the rate-lessening mechanism to act when the feeling agent has advanced a given distance, and independent connections between the feeling agent and the arresting device to cause the arresting device to act when the feeling agent has advanced a given farther distance.

10. In a dimensioning apparatus, the combination, substantially as set forth, with a reducing agent, setting mechanism for automatically advancing said agent to the work to effect continued reduction, and an arresting device to cause said setting mechanism to cease its action and stop the reduction, of a pivoted feeling-lever bearing on the surface being operated upon and advancing as the reduction progresses, a contact-piece in the path of a portion of the feeling-lever, and connections between said arresting device and contact-piece to cause the former to become active and stop the reduction when the lever engages the contact-piece.

11. In a dimensioning apparatus, the combination, substantially as set forth, with a reducing agent, setting mechanism for automatically advancing said agent to the work to effect continued reduction, a rate-lessening mechanism to lower the rate of reducing advance of the reducing agent, and an arresting device to cause said setting mechanism to cease its action and stop the reduction, of a pivoted lever bearing on the surface being operated upon and advancing as the reduction progresses, an adjustable contact-piece arranged to be acted upon by the lever, connections between said contact-piece and rate-lessening mechanism to cause the latter to act when the lever acts on the contact-piece, a second similar adjustable contact-piece, and connections between the second contact-piece and the arresting device to cause the latter to act when the lever acts on the second contact-piece.

12. In a dimensioning apparatus, the combination, substantially as set forth, with a reducing agent, setting mechanism for automatically advancing said agent to the work to effect continued reduction, and an arresting device to cause said setting mechanism to cease its action and stop the reduction, of a feeling agent bearing on the surface being operated upon and advancing as the reduction progresses, a pneumatic engine for actuating said arresting device, an electromagnet controlling the valve of said engine, a circuit-controller actuated by the feeling agent, and circuit connections from said electromagnet to said circuit-controller.

13. In a dimensioning apparatus, the combination, substantially as set forth, with a reducing agent, setting mechanism for automatically advancing said agent to the work to effect continued reduction, a rate-lessening mechanism to lower the rate of the reducing advance of the reducing agent, and an arresting device to cause said setting mechanism to cease its action and stop the reduction, of a feeling agent bearing on the surface being operated upon and advancing as the reduction progresses, pneumatic engines for actuating the arresting device and rate-lessening mechanism, electromagnets controlling the valves of said engines, independent circuit-controllers actuated by the feeling agent, and circuit connections from the electromagnets to the circuit-controllers.

14. In a dimensioning apparatus, the combination, substantially as set forth, with a reducing agent, setting mechanism for automatically advancing said agent to the work to effect continued reduction, and an arresting device to cause said setting mechanism to cease its action and stop the reduction, of a feeling agent bearing on the surface being operated upon and advancing as the reduction progresses, a housing articulately carrying said feeling agent and mounted for adjustment toward and from the work, a contact-piece carried by said housing and moving with it and in position to be acted on by the feeling agent as it moves relative to the housing, and connections between the contact-piece and said arresting device to cause the latter to act when the feeling agent acts on the contact-piece.

15. In a dimensioning apparatus, the combination, substantially as set forth, with a reducing agent, setting mechanism for automatically advancing said agent to the work to effect continued reduction, a rate-lessening mechanism to lower the rate of the reducing advance of the reducing agent, and an arresting device to cause said setting mechanism to cease its action and stop the reduction, of a feeling agent bearing on the surface being operated upon and advancing as the reduction progresses, a housing articulately carrying said feeling agent and mounted for adjustment toward and from the work, a contact-piece carried by said housing and moving with it and in position to be acted on by the feeling agent as it moves relative to the housing, and connections between the contact-piece and said rate-lessening mechanism to cause the latter to act when the feeling agent acts on the contact-piece.

16. In a dimensioning apparatus, the combination, substantially as set forth, with a machine for feeding a reducing agent to the work, of a pivoted lever bearing on the work and moving as the work loses size, and operative connections between the lever and the feedwork of the machine to retard the feed as a given size is reached by the work.

17. In a dimensioning apparatus, the combination, substantially as set forth, with a machine for feeding a reducing agent to the work, of a pivoted lever bearing on the work and moving as the work loses size, and operative connections between the lever and the feedwork of the machine to arrest the feed as a given size is reached by the work.

18. In a dimensioning apparatus, the combination, substantially as set forth, with a machine for feeding a reducing agent to the work, of a pivoted lever bearing on the work and moving as the work loses size, and operative connections between the lever and the feedwork of the machine to retard the feed as a given size is reached by the work and stop the feed when a second and lesser given size is reached by the work.

BENGT M. W. HANSON.

Witnesses:
W. M. STORRS,
G. W. FLEMING.